United States Patent [19]

Davis et al.

[11] Patent Number: 4,735,784
[45] Date of Patent: Apr. 5, 1988

[54] METHOD OF TREATING FLUORIDE CONTAMINATED WASTES

[75] Inventors: Phillip K. Davis, Jefferson County, Colo.; Vijay K. Kakaria, Ada County, Id.

[73] Assignee: Morrison-Knudsen Company, Inc., Boise, Id.

[21] Appl. No.: 884,387

[22] Filed: Jul. 11, 1986

[51] Int. Cl.$^4$ .......................... C01F 1/00; C01B 33/08; C01B 7/11; C04B 33/08
[52] U.S. Cl. ..................... 423/111; 204/167; 252/629; 423/343; 423/484; 501/153; 501/154; 501/155
[58] Field of Search ............... 423/343, 111, DIG. 20, 423/484; 501/151, 153, 154, 155; 252/629; 204/167

[56] References Cited

U.S. PATENT DOCUMENTS

| | | | |
|---|---|---|---|
| 1,196,829 | 9/1916 | Wescott | 23/262 |
| 2,895,799 | 7/1959 | Le Baron et al. | 23/109 |
| 2,995,436 | 8/1961 | Hollingsworth et al. | 71/44 |
| 3,236,606 | 2/1966 | Moore et al. | 23/262 |
| 3,519,815 | 7/1970 | Sandbrook | 250/43.5 |
| 3,561,930 | 2/1971 | Brown et al. | 23/293 |
| 4,020,004 | 4/1977 | Schulz et al. | 501/155 |
| 4,065,551 | 12/1977 | Dahl | 423/483 |
| 4,097,401 | 6/1978 | Guber et al. | 501/155 |
| 4,113,831 | 9/1978 | Orth, Jr. et al. | 423/119 |
| 4,113,832 | 9/1978 | Bell et al. | 423/119 |
| 4,158,701 | 6/1979 | Anderson et al. | 422/194 |
| 4,160,809 | 7/1979 | Anderson et al. | 423/119 |
| 4,362,701 | 12/1982 | Kruger et al. | 423/119 |
| 4,367,075 | 1/1983 | Hartwig | 48/89 |
| 4,439,209 | 3/1984 | Wilwerding et al. | 48/76 |
| 4,444,740 | 4/1984 | Snodgrass et al. | 423/111 |
| 4,469,628 | 9/1984 | Simmons et al. | 252/629 |
| 4,498,896 | 2/1985 | Leis | 494/14 |
| 4,544,499 | 10/1985 | Tran et al. | 252/629 |

FOREIGN PATENT DOCUMENTS 0035570  3/1976  Japan ...................... 501/155

OTHER PUBLICATIONS

"Centrifugally Cast Glass-Ceramic Pipe from Mining and Processing Wastes", by Arthur V. Petty, Jr., from the U.S. Dept. of the Interior, a 35 page document.
Spent Potlining Symposium by Lee C. Blayden et al., a 9 page document.

Primary Examiner—John Doll
Assistant Examiner—Lori S. Freeman
Attorney, Agent, or Firm—Seed and Berry

[57] ABSTRACT

A process for treating solid substantially non-volatile wastes contaminated with a heat sensitive contaminant is disclosed. The wastes are heated to form a liquid slag. The liquid slag is held at elevated temperature until at least a portion of the contaminating components have either decomposed or evolved from the melt as a gas. The slag is subjected to cooling and the contaminating compounds are bound or encapsulated into a solid glassy slag. The process is particularly suitable for handling fluoride and cyanide contaminated aluminum smelting wastes such as spent potliner material. It is advantageous to add silica to such wastes. The residue from the slagging reaction is a glassy solid sodium metal silicate matrix such that the fluoride residues remaining in the wastes are encapsulated. The amount of silicate blended with the feed material is selected to substantially tie up all of the sodium remaining in the residue after slag melting and is typically 7.5 to 50 weight percent of the feed. The resulting solid, glassy slag material produced is not hazardous to health and is essentially inert to the environment.

6 Claims, 1 Drawing Sheet

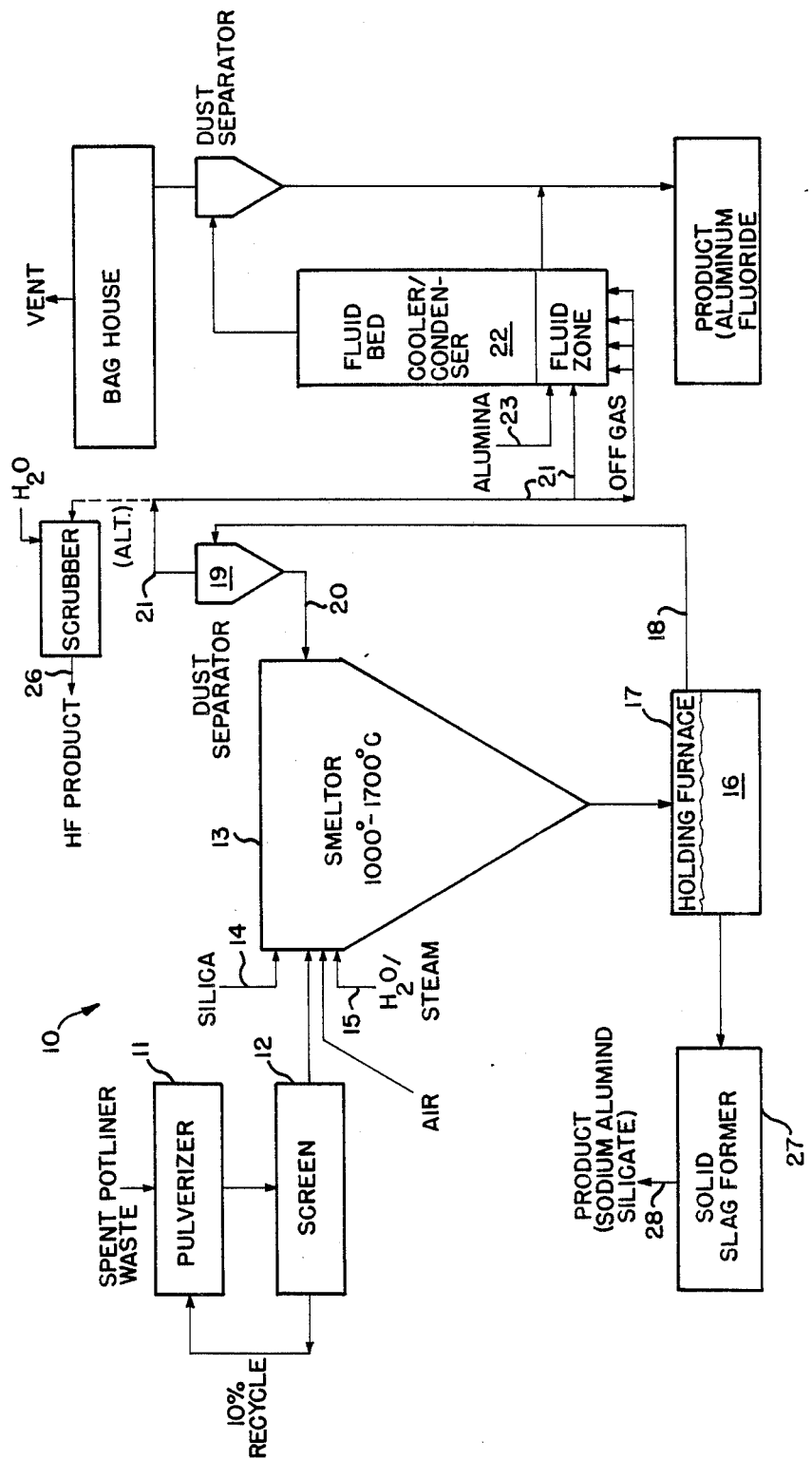

METHOD OF TREATING FLUORIDE CONTAMINATED WASTES

TECHNICAL FIELD

The invention relates to methods for treating wastes that include contaminants that decompose or volatilize at least partially, under high temperature conditions. More particularly, the method of the invention relates to decomposing or volatilizing a portion of waste contaminates and immobilizing the remaining portions of the contaminates in a solid residue that may be disposed of with minimum enviromental impact.

BACKGROUND OF THE INVENTION

Many industries that have recycled wastes to recover valuable components are now finding that their recovery processes present a risk of harm to the environment, in light of the present understanding of requirements for proper disposal of potentially toxic contaminants. Such processes may produce solid waste residues, once thought to be suitable for conventional landfill disposal, that must now be treated as hazardous waste. Such processes originally designed for efficient recovery of a valuable component, must now be redesigned to insure that waste residues remaining from the recovery contain no harmful constituents that must be disposed of into the environment.

In the aluminum smelting industry, fluorides and alumina have long been recovered from wastes generated in the electrolytic smelting of aluminum ores. The electrolytic process generates a number of waste materials that contain, for example, high percentages of fluorides and toxic quantities of cyanide that must be recycled into the process or otherwise disposed of into the environment. Recycling of such waste is sometimes difficult because contaminants may build up in the system over time and ultimately adversely affect product quality. An example of a waste that generally cannot be directly recycled to the smelter is spent carbon cathodes of the electrolytic process. The carbon cathodes are formed into a potliner for containing the aluminum-salt solution that is electrolyzed to produce aluminum. Over time the potliners become impregnated with high levels of fluorides, alumina and sodium. In addition, toxic components such as cyanides become a component of the liner. Other similarly contaminated aluminum smelter wastes are recovered from channel, trench and floor sweepings, spent alumina scrubber absorbents and the like.

The processes employed for treating aluminum industry wastes focus upon the efficient recovery of valuable hydrogen fluoride that is easily recycled into the smelting process. Each of the known processes produces a solid waste residue that includes a significant soluble fluoride residual and a relatively high level of other contaminants such that the residue is generally not acceptable for direct recycling into the aluminum reduction process. These residues are presently placed in a landfill or simply allowed to accumulate on the smelter site as a tailings pile or in sludge ponds. It is these residues which, when contacted with environmental fluids such as ground water, may contaminate water supplies and other valuable resources.

A number of the prior processes for handling aluminum electrolysis wastes involve, for example, pyrohydrolysis of the smelting wastes for recovery of the fluoride values. Such a process is described by Kruger et al., U.S. Pat. No. 4,362,701, in which waste products of carbon, $Al_2O_3$, $Na_2O$ and fluorine are pyrolized in a rotating kiln with steam and oxygen introduced countercurrently at temperatures on the order of 1200°–1800° C. Kruger recognizes that recovery is enhanced by high temperature, but that if temperatures are too high, there is formation of slag and encrustations that impede the continuity of the operation. Thus, Kruger insures that the feed material remains in particulate form by initially combining the feed with a substantially inert component that does not soften at process temperatures.

Bell et al. in U.S. Pat. No. 4,113,832 pyrohydrolyzes spent pot lining material by introducing the material into a furnace in contact with water at 1100°–1350° C. The process generates an off-gas which may be utilized in the production of NaF or $AlF_3$. The process produces a solid clinker-type material that is subjected to alkaline digestion for recovery of an alkali aluminate solution from which high purity aluminum is recovered.

A number of the prior art processes pyrohydrolyze solid carbonaceous aluminum smelter wastes for fluoride recovery by contacting with a fluidizing stream of steam or air in a fluid bed furnace reactor. Such processes are described by Anderson et al. in U.S. Pat. Nos. 4,160,809 and 4,065,551.

None of the processes described in the literature produce a final waste residue from the recovery that is rendered inert to health and environmental risks. Thus in Anderson et al., in U.S. Pat. No. 4,158,701 and Bell et al. in U.S. Pat. No. 4,113,832 the clinker solid residual produced is extracted for alumina recovery, but results in a final residue containing all of the undesirable impurities which must be then disposed of into the environment.

DISCLOSURE OF THE INVENTION

It is an object of the invention to provide a method for treating certain contaminated waste in a manner that treats the contaminants at high temperature to render them harmless, for example, by decomposition. Alternatively, the process of the invention may convert a sufficient portion of contaminants into a gaseous component that evolves from the waste such that the remaining contaminating components are bound into a solid residue material in a manner whereby leaching therefrom by environmental fluids is minimized.

It is a particular object of the invention to provide a process for treating fluoride-contaminated waste from the electrolytic smelting of alumina. Such waste, such as spent cathodes from the smelting pot lines, as well as other aluminum wastes, are typically contaminated with a high percentage of fluorides and smaller amounts of other materials of concern, such as cyanides, all of which typically give rise to concerns for the environment if such wastes were to be disposed of directly into a landfill. It is an object of this invention to provide a process that recovers the valuable constituents from such waste, particularly the fluorides, yet produces a solid residue that is sufficiently inert in the environment that it may allow disposal by ordinary land filling means.

A principal step in the method of the invention is heating the contaminated waste such that it completely melts into a liquid slag. The waste is held at the elevated temperature for a period of time sufficient for contaminates to decompose to harmless components or for a portion of the contaminantes to evaporate or sublime from the liquid. The liquid slag is then subjected to cooling, whereby a glassy solid is formed such that contaminate residuals are bound or encapsulated in the slag. The contaminates are held in the slag such that they are essentially non-leachable from the slag.

In treating the spend potliner waste, it is a particular advantage to add silica to fuse with typical waste residuals such as sodium and alumina to produce a solid silicate material. For spent aluminum potliner material, the resulting sodium alumina silicate binds fluorides and other contaminants therein in a manner such that they are essentially non-leachable from the silicate product.

The process of the invention for treating fluoride-contaminated waste to produce an environmentally stable solid waste residue thus may include, as a first step, adding a quantity of silica to the fluoride-containing waste. The addition of silica in an amount up to about 50% by weight is preferred. The amount of silica often preferred is that which will tie up residual sodium and leachable contaminants such as fluorides into a solid silicate product. For spent potliner material of typical compositions, a most preferred range of silica addition is about 7 to 30 weight percent of the fluoride-containing waste, is generally sufficient.

The waste-silica mixture is then elevated in temperature until the mixture melts to form a liquid slag. For spent potliner, the slag is held at the elevated temperature until a desired portion of the fluoride component has evolved as a gaseous fraction from the waste. It is normally preferred to add sufficient silica to cause substantially all of the fluoride contaminates to be volatilized for recovery as hydrogen fluoride. The liquid slag is then cooled to produce a glassy solid slag residue such that the fluoride remaining therein is held in a sodium alumina silicate material such that the fluorides are essentially non-leachable into the environment by typical environmental fluids.

Preferably, the waste is comminuted before it is mixed with the silica. The mixture is elevated to slagging temperature in a convenient apparatus such as a rotating kiln or furnace. The melting temperature preferably employed for spent potliner material is on the order of 1000°-1700° C. Where the waste material is spent aluminum reduction cell liners, the major carbon content thereof is combusted in the process of smelting, providing all or a portion of the process heat requirement. The method is suitable for any contaminated material that will partially pyrolyze or oxidize to harmless components in a smelting process or volatilize, leaving behind a contaminates residue that can be immobilized by binding into a slag. The residual contaminates are encapsulated or bound in a manner that is essentially non-leachable from the solid residue produced. The solid residue produced is a glassy material which may be cast, granulated, or otherwise formed into a convenient form for disposal or recycle. The process of the invention is particularly suitable for treating a fluoride contaminated waste residue to produce an environmentally inert solid residue. Preferably, in treating such fluoride containing wastes of an aluminum smelter, steam is injected into the smelting process whereby the fluoride converts to hydrogen fluoride evolving as a gas which may then be redirected back into the alumina smelting process.

The waste material may be smelted in any conventional furnace, kiln or flash smelter where the waste is elevated in temperature, resulting in melting of the waste feed into a liquid slag. The slag may be transferred into a holding furnace, if desired, for maintaining the liquid slag at the elevated temperature until a desired portion of the contaminates, such as fluoride, evolves. Sufficient contaminating component is evolved such that the contaminate remaining in the slag, upon cooling, is bound into the cooled solid slag, and is not significantly extractable by environmental fluids.

BRIEF DESCRIPTION OF THE DRAWING

The FIGURE is a schematic drawing of a method of the invention for treating spent potliners from the aluminum industry.

BEST MODE FOR CARRYING OUT THE INVENTION

Referring to the FIGURE, the preferred method or process of the invention is shown schematically. The preferred process is directed toward recovery of fluorides from an aluminum smelting waste in a manner that leaves a solid residue that presents no risk to human health and is essentially inert to the environment.

A typical feed material of the process of the invention is spent aluminum reduction potliners. After several years of service, the lining fails and is removed as waste. The waste material is impregnated with fluoride, aluminum, sodium and cyanide. A typical composition of spent liner material is shown in Table 1.

TABLE 1

| Composition of Spent Potlining | |
|---|---|
| Element | % by Weight |
| F | 15.30 |
| Al | 16.00 |
| Na | 17.80 |
| Si | 0.18 |
| C | 26.60 |
| Ca | 1.41 |
| CN | 0.26 |

The cyanide component of the waste typically renders the waste potentially harmful to human health. Thus, a requirement of the process of the invention is to attain sufficient temperatures to destroy the cyanide component, in addition to recovering fluoride in a suitable form.

Spent potliner waste 10 is first comminuted in a suitable pulverizer 11 to a size suitable for the smelting unit employed. A preferred size is on the order of less than one-quarter inch in diameter. The pulverized waste is classified by a screening system 12 and oversize material is recycled back to the pulverizer 11 as necessary. The acceptably sized waste feed material is metered and injected into a smelting unit 13 that ignites the carbon and other combustible content of the feed and melts the non-combustible components into a liquid slag.

In a preferred method of the invention, shown in the FIGURE, a metered amount of silica 14 is simultaneously injected with the feed 10. The silica 14, depending upon feed analysis, is injected in a preferred amount of about 7.5-50 weight percent with respect to the spent potliner. High temperature steam 15 is also injected into the smelting unit 13 as a means of pyrohydrolyzing the fluoride content into a gaseous hydrogen fluoride product. At least about 0.47 pounds of water is required for each pound of desired to be recovered from the feed. The steam may be injected with the feed or into the liquid smelt leaving the smelting unit. The amount of silica is such that residual sodium and contaminates content is ultimately immobilized in a sodium alumina silicate product. Other reaction conditions are balanced to produce either gaseous hydrogen fluoride or subliming sodium fluoride, as desired.

The liquid smelt or slag 16 produced by the smelting unit 13 is transferred to a holding furnace 17 where the pyrohydrolysis reaction continues. Temperatures in the smelting unit and holding furnace are on the order of 1000°–1700° C., as necessary, to maintain the reactants in a liquid slag form. The slag 16 is held in the furnace 17 for a period of time sufficient for the pyrohydrolysis or other reaction to proceed to a desired level. Gaseous components 18, such as hydrogen fluoride, carbon dioxide, and the like, evolve from the slag 16 and are directed into a cyclone 19 for separating dust solids 20 therefrom. The cleaned gases 21 are subsequently introduced into a desired recovery process.

The gases 21 may be directed into a fluidized bed 22 and contacted with alumina 23 to produce aluminum fluorides 24 that may be directly injected as an electrolyte in the aluminum reduction cells. Alternatively, conditions in the smelting unit may be adjusted so that the gases 21 generated are substantially totally hydrogen fluoride. In this operating mode, the hot vapors 21 are contacted in a scrubber 25 with water, producing a hydrogen fluoride solution 26.

The slag 16 from the holding furnace 17 is tapped and introduced into a slag former 27, which may involve casting, granulating or spinning or the like to form the liquid slag 16 into a desired solid slag product 28. The slag is substantially a sodium aluminosilicate including the fluoride residue held or encapsulated therein. The product is a glassy solid that is essentially inert to the environment. The volume of the material is, of course, greatly reduced from that of the original waste, since the carbon value has been combusted and a substantial portion of the fluoride content recovered for reuse.

The melting treatment, preferably in the presence of a significant amount of silica, takes place at about 1000° C. The melting process is preferably operated in the temperature range of 1000°–1700° C. The presence of the silica suppresses the melting point of the waste material significantly, in addition to suppressing vaporization of sodium and tying up residual fluoride.

The following example demonstrates the various aspects of the invention.

Example

A series of samples of spent aluminum potliner having the composition as appears in Table 1 were powdered to 100% less than ¼ inch blended with powdered silica. The mixture was then subjected to smelting in accordance with the process of the invention, as outlined in Table 2 below. The system employed a batch furnace including an atmosphere of oxygen and water vapor.

The smelting test results are reported in Table 3 below and show that fluorine is recoverable from potliner material under smelting conditions without significant transport of silica from the slag. Sodium transport varies as a function of temperature and other processing conditions. The data show that the percent fluorine removed is adjustable depending upon the reaction conditions employed. Tests 4 and 5 show the impact of the silica addition upon the reaction mixture melting temperature. Adding 11.1% silica suppresses the melting temperature of the mixture such that at 1210° C. the solid product produced is a brown, glassy slag. As reported in Test 5, in the absence of silica, the potliner does not completely melt, producing a slag containing potliner nodules. The presence of the nodules suggests the processing difficulties reported in the prior art which heretofore has taught that these recovery processes must operate in the non-slagging zone, sacrificing fluoride recovery, in order to remain in an operating range where the materials are smoothly flowable particulates.

Leachate tests were performed on the test samples, analyzing for both fluoride and cyanide contamination. The test slags were crushed to 100% less than 80 mesh and leached with deionized water at 13 times the sample weight while tumbling for 24 hours. The analyses were undertaken to verify destruction of cyanide residues in the spent potliner, as well as demonstrating the immobility of residual fluorine as a consequence of smelting with substantial levels of silica. Table 4 reports the results of the leachate tests. Test sample 6 is the waste potliner material of Table 1, prior to smelting. Test sample 7 is the residue of Test 6 tumbled with 10 times the original sample weight of deionized water for 24 hours. Tests 6 and 7 clearly show the high mobility of fluorides and cyanide from the untreated potliner exposed to environmental fluids such as water. Examination of the Table 4 data clearly shows that the cyanide is completely destroyed during the smelting operation and that the fluoride residue remaining in the process waste is immobilized.

TABLE 2

Smelting Tests

| Test | Potliner (gms) | $SiO_2$ (gms) | Temp °C. | Time (hrs) | Description of Final Solid Product |
|---|---|---|---|---|---|
| 1 | 2.5 | 2.5 | 1400 | 0.50 | Black Glassy Slag |
| 2 | 4.0 | 1.0 | 1210 | 1.00 | Brown Glassy Slag |
| 3 | 7.0 | 3.0 | 1154 | 0.67 | Brown Glassy Slag |
| 4 | 4.0 | 0.5 | 1210 | 0.50 | Brown Glassy Slag |
| 5 | 10.0 | — | 1210 | 0.50 | Some potliner nodules encapsulated in slag |

TABLE 3

Smelting Test Results

| Test | Percent F Removed | Percent C Removed | Percent Na Removed |
|---|---|---|---|
| 1 | 57.6 | 98.8 | 0 |
| 2 | 81.4 | 99.6 | 65.6 |
| 3 | 64.9 | 78.8 | 40.4 |
| 4 | 89.0 | 99.9 | — |
| 5 | 69.2 | 78.5 | 32.2 |

TABLE 4

Leachate Tests

| Test | mg/L F Leachate | Mg/L CN Leachate | CN (residue) |
|---|---|---|---|
| 1 | 5.4 | <0.01 | <5 ppm |
| 2 | — | — | — |
| 3 | 111.0 | <0.01 | <5 ppm |
| 4 | 5.6 | <0.01 | <5 ppm |
| 5 | 159.0 | <0.01 | <5 ppm |
| 6 | 4360.0 | 160.0 | — |
| 7 | 1330.0 | 3.6 | — |

From the foregoing, it will be appreciated that, although embodiments of the invention have been described herein for purposes of illustration, various modifications may be made without deviating from the spirit and scope of the invention. Accordingly, the invention is not limited except as by the appended claims.

We claim:

1. A method for treating spent aluminum smelting potliner material containing fluoride contaminants, which comprises:
   adding silica to said material to form a mixture thereof;
   elevating the temperature of said mixture within the range of 1,000° to 1,700° C. to form a slag;
   providing sufficient silica in the mixture and forming the slag in the presence of sufficient water for pyrohydrolysis conditions resulting in the volatilization of substantially all of the fluoride contaminants mostly in the form of hydrogen fluoride; and
   cooling the slag remaining after volatilization of substantially all of the fluoride contaminants to produce an insoluble silicate glass-residue containing any remaining portion of the fluoride contaminants in an immobile state.

2. A method for treating spent aluminum smelting potliner material containing fluoride contaminants, which comprises:
   adding silica to said material to form a mixture thereof;
   elevating the temperature of said mixture within the range of 1,000° to 1,700° C. to form a slag;
   forming the slag in the presence of sufficient water for pyrohydrolysis conditions resulting in the volatilization of substantially all of the fluoride contaminants in the form of hydrogen fluoride and sodium fluoride;
   controlling the relative amounts of hydrogen fluoride and sodium fluoride produced by the amount of silica added; and
   cooling the slag remaining after volatilization of substantially all of the fluoride contaminants to produce an insoluble silicate glass-residue containing any remaining portion of the fluoride contaminants in an immobile state.

3. A method for treating spent aluminum smelting potliner material containing fluoride and other contaminants, which comprises:
   adding silica to said material to form a mixture thereof:
   elevating the temperature of said mixture within the range of 1,000° to 1,700° C. to form a slag;
   providing sufficient silica in the mixture and forming the slag in the presence of sufficient water for pyrohydrolysis conditions resulting in the volatilization of substantially all of the fluoride contaminants in the form of hydrogen fluoride; and
   cooling the slag remaining after volatilization of substantially all of the fluoride contaminants to produce an insoluble silicate glass-residue containing the non-volatilized contaminants in an immobile state.

4. The method of claim 3 wherein said contaminants include cyanides.

5. The method of claim 3 wherein the water is provided as steam.

6. The method of claim 3 wherein said silica is in the range of 7 to 50 percent by weight of the spent potliner material.

* * * * *